Figure 1:
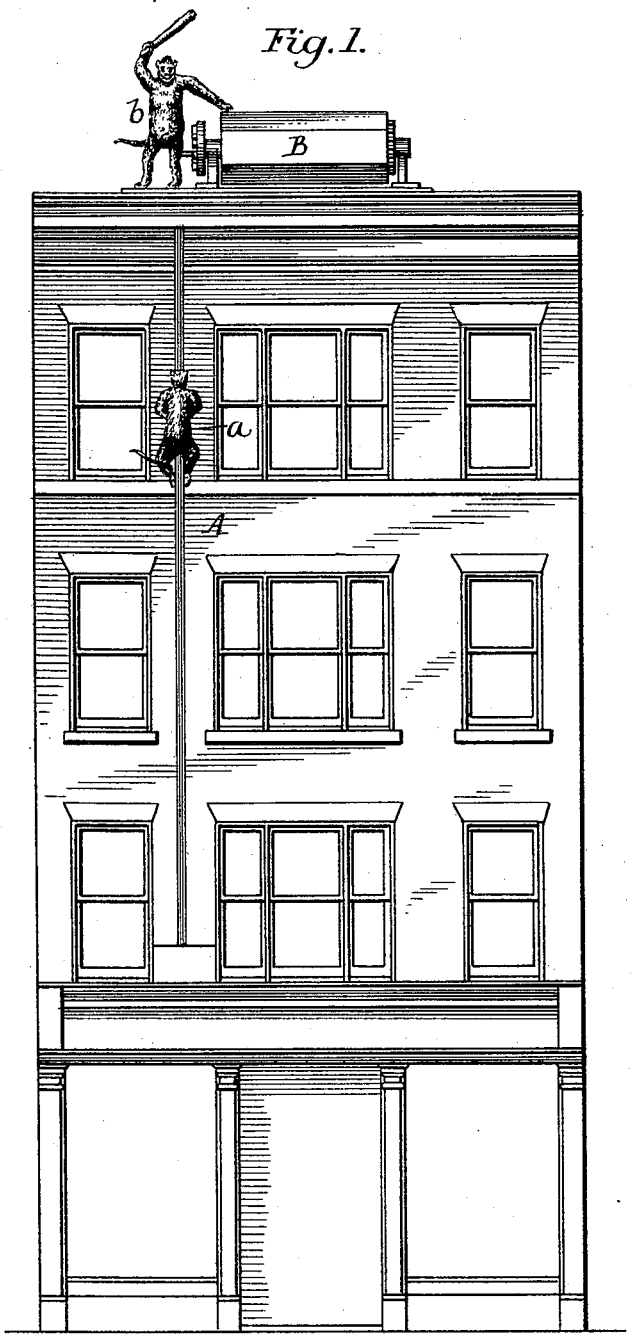

(No Model.)   3 Sheets—Sheet 1.

P. T. KENNY.
AUTOMATIC FIGURE ADVERTISING DEVICE.

No. 568,854.   Patented Oct. 6, 1896.

Witnesses
Inventor
Paul T. Kenny
by Watson & Watson Attorneys (No Model.) 3 Sheets—Sheet 2.
P. T. KENNY.
AUTOMATIC FIGURE ADVERTISING DEVICE.
No. 568,854. Patented Oct. 6, 1896.
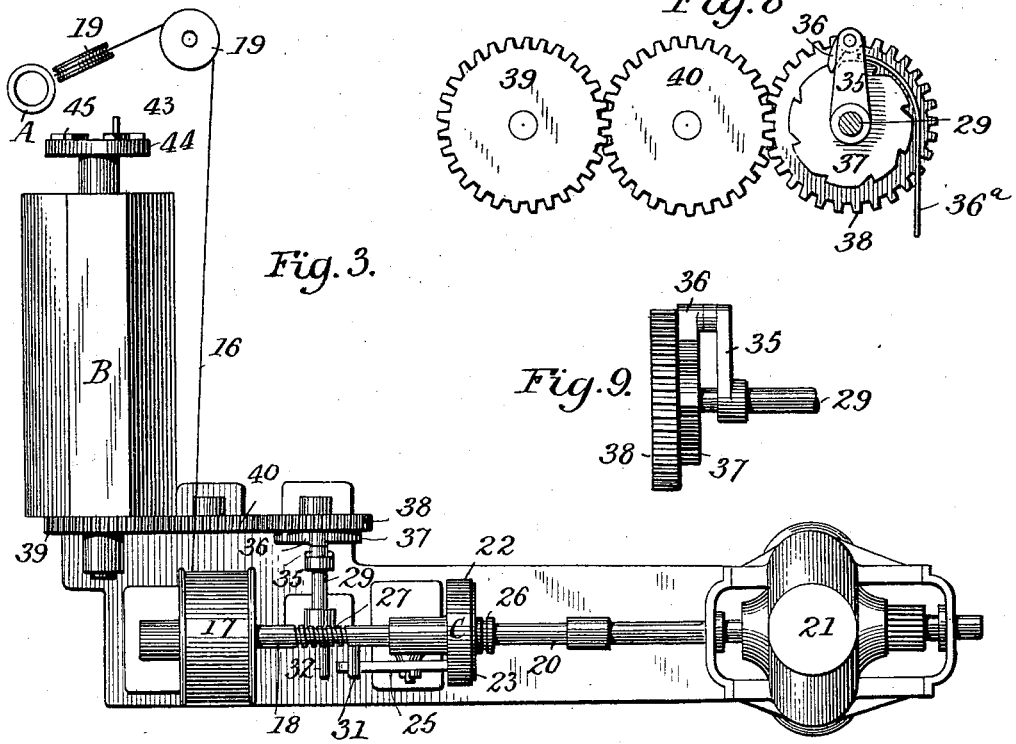
Witnesses
Jno. G. Hukel
William E. Neff
Inventor
Paul T. Kenny
by Watson & Watson
Attorneys (No Model.)  3 Sheets—Sheet 3.
P. T. KENNY.
AUTOMATIC FIGURE ADVERTISING DEVICE.
No. 568,854.  Patented Oct. 6, 1896.
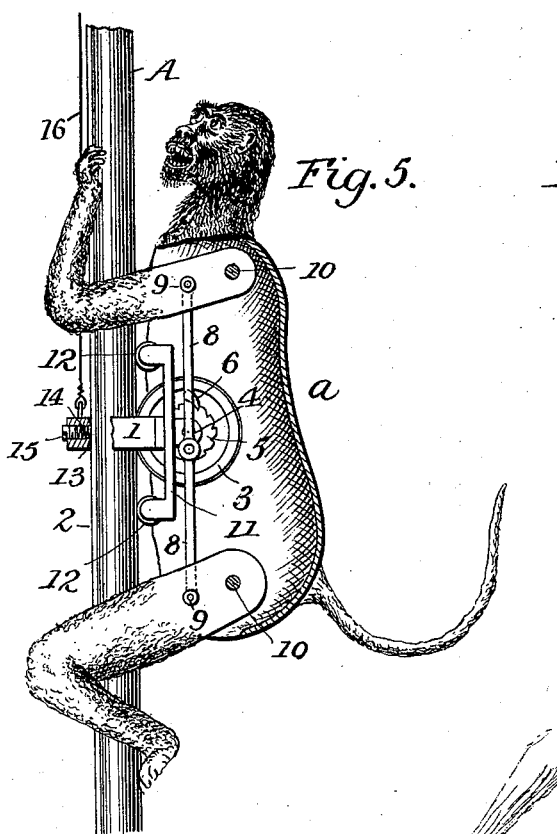
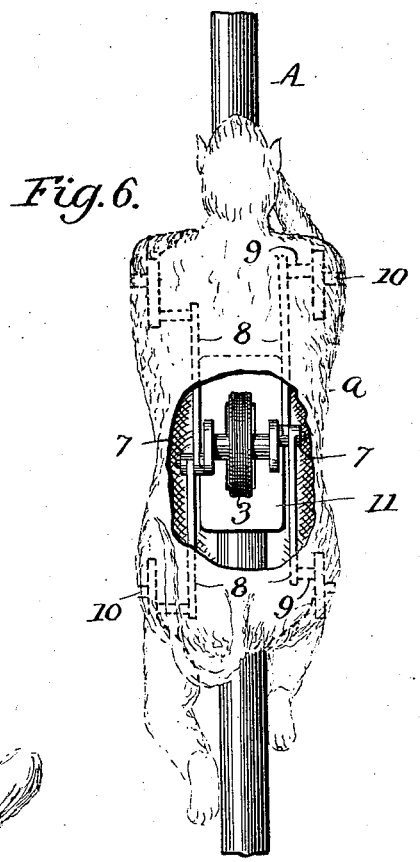
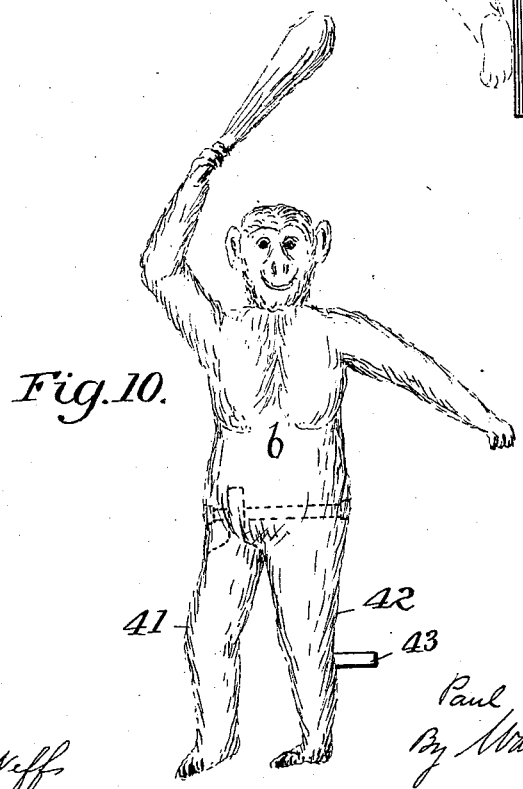
Witnesses  
Inventor  
Paul T. Kenny  
By Watson & Watson  
Attorneys

UNITED STATES PATENT OFFICE.

PAUL T. KENNY, OF NEW YORK, N. Y.

AUTOMATIC-FIGURE ADVERTISING DEVICE.

SPECIFICATION forming part of Letters Patent No. 568,854, dated October 6, 1896.

Application filed January 23, 1896. Serial No. 576,507. (No model.)

*To all whom it may concern:*

Be it known that I, PAUL T. KENNY, a citizen of the United States, residing at New York, in the county of New York and State of New York, have invented certain new and useful Improvements in Automatic-Figure Advertising Devices, of which the following is a specification.

My invention consists in devices for exhibiting advertisements upon a large scale and automatically moving the figures of animals for attracting attention to the advertising-matter.

In the illustrations accompanying the specification I have shown a rotating polygonal drum having on each of its sides a different advertisement, the drum being placed on top of a building, so as to be visible from the street. A pole is arranged on the front of the building and a monkey is seen climbing up the pole. At the top of the pole and connected to the advertising-drum is a second monkey, who stands with a raised club, looking over the eaves at the climbing monkey in a menacing attitude. The figures are so operated that when the climbing monkey reaches the top of the pole the upper monkey strikes at him with a club and the climber simultaneously appears to release his hold upon the pole and drops to the bottom, when he immediately begins to climb again hand over hand up the pole preparatory to going through the same cycle of operations again.

I contemplate using the figures of different animals and human beings in connection with my advertising devices. I may use a figure of a bear climbing up the pole, to be tomahawked by an Indian; or a parrot climbing up, to be struck by a monkey; or a pickaninny ascending the pole, to be surprised and whacked on the head by a negro woman; or a colored gentleman climbing up to a hen-roost, to be surprised and clubbed by a farmer as he is about to lay hold of a chicken. I shall therefore, for convenience, in the following specification refer to the animal portion of the apparatus as the "climbing figure" and the "striking figure," respectively, it being understood that those terms include any figures which I may desire to substitute for the monkeys shown.

The advertising device proper may be any movable device which will display a series of advertisements successively, and in some instances I may use my invention in connection with a single stationary advertisement. I provide a motor and mechanism connected therewith for actuating the climbing figure and the striker at the proper times, and also for shifting the advertisements. The climbing figure is connected to the moving mechanism by a suitable cord or rope, and within this figure there is mechanism constructed to move the arms and legs of the figure when it is going up the pole, in imitation of the usual climbing movements. When the figure is falling down, the arms and legs are not actuated by this mechanism, so that the figure appears to slide down.

I will now proceed to describe the invention in detail, reference being had to the accompanying drawings, in which—

Figure 2:
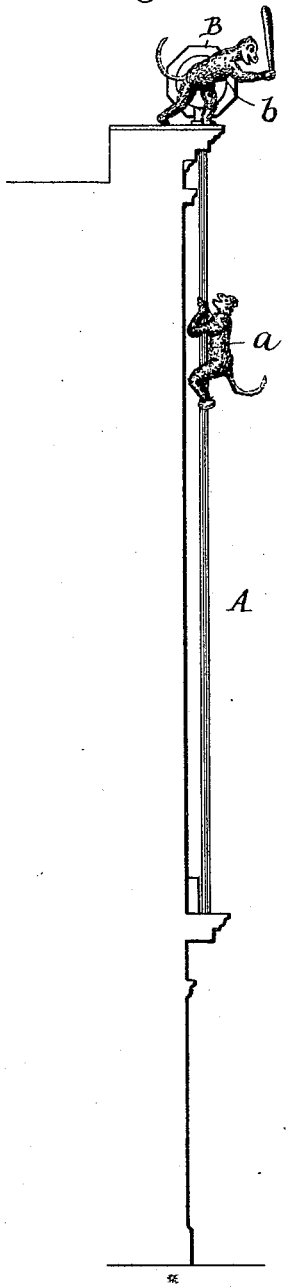

Figure 1 is a front view of a building upon which my invention is mounted. Fig. 2 is a side view of the front of the building. Fig. 3 is a plan view of the operating mechanism. Fig. 4 is a side view, parts being shown in section. Fig. 5 is an enlarged view of the climbing figure, partly in section, to show the interior mechanism. Fig. 6 is a rear view of the same, a part being broken away. Fig. 7 is a front view of the advertising device. Fig. 8 is a side view of the train of gearing which operates the advertising device. Fig. 9 is an edge view of the pawl-and-ratchet mechanism for operating this gearing, and Fig. 10 is an enlarged view showing the construction of the striking figure.

Referring to the drawings, A indicates a pole attached to the front of a building, the pole being of any suitable length and material, such, for instance, as a malleable-iron pipe. Upon the pole is a climbing figure *a*, and on top of the building just above the pole stands a figure *b*, holding a club or weapon in a menacing attitude. Close to the striking figure *b* is the advertising device B, which, as shown, is a polygonal drum having different advertisements upon its several sides. The figure *a* is attached to the pole by means of a yoke or band 1, which encircles the pole, and a rail 2 in the rear of the pole is provided to prevent the figure from turning upon it. Within the figure is a friction-wheel 3, which runs upon the pole, the wheel 3 being loosely mounted upon a shaft 4. Rigidly connected with this shaft is a ratchet-wheel 5, which is driven by the friction-wheel while the figure is ascending, through the medium of a pawl 6. When the figure is descending, the ratchet-wheel remains stationary, and the mechanism for operating the limbs of the figure is also stationary. This mechanism consists in a pair of cranks 7 upon the shaft 4 and connecting-rods 8, which connect the cranks to the limbs 9 of the figure, which limbs are mounted upon pivots 10. Upon the base 11, which carries the friction-wheel, I have shown a pair of guide-rollers 12, adapted to run upon the pole and keep the figure in its proper vertical position. In order to hold the friction-wheel 3 against the pole with any desired tension, I provide a spring-bearing in the yoke 1 opposite the wheel. As shown, this consists of a shoe 13, which bears upon the pole or the rail 2, and a spring 14, interposed between the shoe and an adjustable screw-threaded bearing 15.

The climbing figure is connected by the rope or wire 16 with a winding-drum 17 upon a shaft 18. This rope 16 passes over suitable pulleys 19 and down in the rear of the pole, where it is hidden from view, and connects with the yoke 1 of the climbing figure. In line with the shaft 18 is a power-shaft 20, which is constantly rotated by a suitable motor 21. The shafts 18 and 20 are connected by a clutch C, which, as shown, consists of a member 22, fixed upon the shaft 18, and a member 23, arranged to slide upon and turn with the power-shaft 20. The two members of the clutch are normally disengaged by an interposed spring 24, and they are engaged at proper times by means of a lever 25, one arm of which interlocks with a circumferential groove 26 upon the hub of the movable clutch member 23. Upon the drum-shaft 18 is a worm 27, which engages a worm-gear 28 upon a cross-shaft 29. Upon the worm-gear 28 is a circular slot or groove 30, in which are adjustably fastened two projecting pins 31 and 32. The clutch-lever 25 carries a pin 33, which is engaged by the hook of a locking-lever 34 when the clutch is closed, the locking-lever 34 thus holding the clutch closed until it is operated to release the pin 33, when the spring 24 automatically opens the clutch. The levers 25 and 34 project into the paths of the pins 31 and 32, respectively.

The operation of the mechanism so far described is as follows: The motor-shaft is rotated continuously, and we will assume the clutch C is closed and that the drum 17 is winding up the rope 16, which draws up the figure. The rotation of the shaft 18 turns the worm-wheel 28, and just as the figure reaches the top of the pole the pin 32 moves the locking-lever 34, which unlocks the clutch-lever 25 and permits the spring 24 to open the clutch. As soon as the clutch is open the shaft 18 is free to revolve independently of the motor-shaft, and the weight of the climbing figure causes it to slide down the pole and unreel the rope from the drum 17. The backward movement of the shaft 18 and worm-wheel 28 brings the pin 31 into engagement with the clutch-lever 25, and again closes the clutch just as the figure reaches the bottom of the pole. The figure then climbs the pole and the operations above outlined are repeated continuously. In Fig. 4 the levers 25 and 34 are shown locked together in full lines and unlocked in dotted lines. The pins 31 and 32 are adjustable in the worm-wheel, so that the range of movement of the climbing figure can be regulated to suit the length of the pole and other circumstances.

The device B for displaying the advertisements and the striking figure are, as shown, operated by the worm-wheel shaft 29 and a connecting train of gearing. Upon the shaft 29 is an arm 35, carrying a pawl 36, which engages in notches in a disk 37, the disk 37 being attached to a gear-wheel 38, which is loose upon the shaft 29. It will be evident that the shaft 29 is a rock-shaft, which is driven backward and forward by the worm and worm-gear. While the climbing figure is falling, the shaft 29 moves backward and the gear-wheel 38 remains stationary. While the figure is climbing up the pole the pawl 36 rides upon a shield 36$^a$ until near the end of its travel, when it drops into a notch in the disk 37, and the gear-wheel 38 is driven forward and a new card on the advertising device is displayed, the gear 38 being connected with a gear 39 upon the rotary drum B through an intermediate gear 40. One leg 41 of the striking figure is attached rigidly to the roof or other suitable support, and the body is pivoted to the upper part of this leg, as shown in Fig. 10. The leg 42 is connected rigidly to the body, and upon it is a projecting pin 43. Upon the shaft of the drum B is a disk 44, carrying tappets 45, which, at proper times, engage the pin 43 and throw the leg 42 backward and the body of the figure forward, causing it to strike downward with the club or other weapon held in its hand. The leg 42 is weighted, so that the figure will immediately return to the vertical position after the pin 43 is freed from the tappet 45. The tappets are so located upon the disk 44 that they will operate the striking figure just as the climbing figure reaches the top of the pole.

It will be evident that the details of the operating mechanism shown and described may be considerably varied without departing from the spirit of my invention.

Without therefore limiting myself to the precise construction and arrangement of parts illustrated and described, I claim—

1. The combination with a device for displaying advertisements, of the pole adjacent to said device, the climbing figure movable upon the pole, the striking figure adjacent to the top of the pole, and means for operating said figures, substantially as described.

2. The combination in an advertising device, of the pole, the climbing figure upon the pole, a striking figure adjacent to the top of the pole, means for raising the climbing figure and imparting a climbing movement thereto, means for operating the striking figure as the climbing figure reaches the top of the pole, and means for releasing and dropping the climbing figure simultaneous with the operation of the striking figure, substantially as described.

3. The combination in an advertising device, of the pole, the climbing figure upon the pole, a suspending wire or rope for said figure, a drum for winding said rope to raise the figure, a continuously-operating motor, a clutch between the motor and the drum, and means for disengaging the clutch when the figure reaches the top of the pole, whereby the drum is permitted to unwind freely, and means for engaging the clutch members as the figure reaches the bottom of the pole whereby the drum is again set in motion to wind the rope and raise the figure, substantially as described.

4. The combination with a device for displaying advertisements and the pole, of a figure having movable limbs, a friction-wheel mounted in the figure and engaging the pole, mechanism for moving the limbs of the figure and a pawl-and-ratchet device constructed and arranged to engage said mechanism with the friction-wheel during the upward movement of the figure, whereby the limbs are given a climbing movement, and to disengage said mechanism from the friction-wheel as the figure descends the pole, substantially as described.

5. The combination with the device for displaying advertisements, of the pole, the climbing figure upon the pole, movable limbs upon the figure and mechanism for operating the same, the friction-wheel for operating said mechanism, the yoke surrounding the pole, and means for varying the pressure of the friction-wheel upon the pole, substantially as described.

6. The combination with the pole and the climbing figure, of the striking figure adjacent to the top of the pole and having its body movably mounted upon a pivot, the motor, the drum-shaft and drum, the suspending-rope connecting the climbing figure with the drum, the disk 44 operated periodically by the drum-shaft through a suitable train of mechanism, and tappets upon said disk arranged to engage and move the striking figure, substantially as described.

7. In an advertising device, the combination with the pole and the climbing figure, of the motor-shaft, the drum and the drum-shaft, the rope connecting said figure with the drum, the clutch connecting the motor-shaft with the drum-shaft, the clutch-lever for operating the clutch, the locking-lever for locking the clutch in its closed condition, the worm on the drum-shaft, the worm-wheel meshing with said worm, and the adjustable pins on the worm-wheel, said pins being arranged to engage alternately with the clutch-lever and the locking-lever, substantially as and for the purpose described.

In testimony whereof I affix my signature in presence of two witnesses.

PAUL T. KENNY.

Witnesses:
H. W. BAKER,
W. T. DEMAREST.